(12) United States Patent
Xu et al.

(10) Patent No.: US 11,812,452 B2
(45) Date of Patent: Nov. 7, 2023

(54) METHODS, APPARATUS AND SYSTEMS FOR TRANSMITTING SIGNAL AND CHANNEL INFORMATION

(71) Applicant: ZTE CORPORATION, Guangdong (CN)

(72) Inventors: Hanqing Xu, Shenzhen (CN); Yajun Zhao, Shenzhen (CN); Xincai Li, Shenzhen (CN); Ling Yang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 416 days.

(21) Appl. No.: 17/149,577

(22) Filed: Jan. 14, 2021

(65) Prior Publication Data

US 2021/0235456 A1 Jul. 29, 2021

Related U.S. Application Data

(63) Continuation of application No. PCT/CN2018/095930, filed on Jul. 17, 2018.

(51) Int. Cl.
*H04W 56/00* (2009.01)
*H04W 72/53* (2023.01)
(Continued)

(52) U.S. Cl.
CPC ......... *H04W 72/53* (2023.01); *H04W 56/001* (2013.01); *H04W 72/046* (2013.01);
(Continued)

(58) Field of Classification Search
CPC ... H04W 72/53; H04W 72/30; H04W 56/001; H04W 72/0446; H04W 72/046; H04W 74/0833
(Continued)

(56) References Cited

U.S. PATENT DOCUMENTS

2017/0331577 A1  11/2017  Parkvall et al.
2019/0191435 A1*  6/2019  Gao .................. H04W 72/0446
(Continued)

FOREIGN PATENT DOCUMENTS

CN  106455040 A  2/2017
CN  107371229 A  11/2017
(Continued)

OTHER PUBLICATIONS

First Office Action for CN Appl. No. 2018800956651, dated May 19, 2022 (13 pages, with English translation).
(Continued)

*Primary Examiner* — Sai Ming Chan
(74) *Attorney, Agent, or Firm* — Foley & Lardner LLP

(57) ABSTRACT

Methods, apparatus and systems for transmitting signal and channel information in a wireless communication are disclosed. In one embodiment, a method performed by a wireless communication node is disclosed. The method comprises: determining a first time domain position associated with a transmission of a first block according to a first configuration; and transmitting a second block at the first time domain position according to a second configuration, wherein the second configuration is different from the first configuration.

20 Claims, 7 Drawing Sheets

(51) Int. Cl.
*H04W 72/0446* (2023.01)
*H04W 72/044* (2023.01)
*H04W 74/08* (2009.01)
*H04W 72/30* (2023.01)

(52) U.S. Cl.
CPC ... *H04W 72/0446* (2013.01); *H04W 72/0466* (2013.01); *H04W 72/30* (2023.01); *H04W 74/0833* (2013.01)

(58) Field of Classification Search
USPC ........................................................ 370/329
See application file for complete search history.

(56) References Cited

U.S. PATENT DOCUMENTS

| | | | | |
|---|---|---|---|---|
| 2019/0239057 A1* | 8/2019 | Hwang | ................ | H04L 5/1469 |
| 2019/0254026 A1* | 8/2019 | Liu | ................ | H04W 72/04 |
| 2020/0288377 A1* | 9/2020 | Liu | ................ | H04W 48/14 |
| 2020/0296765 A1 | 9/2020 | Kim et al. | | |
| 2022/0216967 A1* | 7/2022 | Gong | ................ | H04L 5/0044 |

FOREIGN PATENT DOCUMENTS

| | | |
|---|---|---|
| CN | 108260223 A | 7/2018 |
| KR | 20170125741 A | 11/2017 |
| RU | 2658902 C2 | 6/2018 |
| WO | WO-2017/155239 A2 | 9/2017 |
| WO | WO-2017/155239 A3 | 9/2017 |
| WO | WO-2018/064372 A1 | 4/2018 |
| WO | WO-2018/097680 A1 | 5/2018 |
| WO | WO-2018/129123 A1 | 7/2018 |
| WO | WO 2018082470 A1 | 5/2019 |

OTHER PUBLICATIONS

International Search Report and Written Opinion on International Application No. PCT/CN2018/095930 dated Apr. 12, 2019 (6 pages).
First Office Action for RU Appl. No. 2021103790, dated Oct. 7, 2021 (with English translation, 12 pages).
Extended European Search Report for EP Appl. No. 18926503.6, dated Feb. 1, 2022 (10 pages).
Notice of Allowance on KR Appl. No. 10-2021-7004682, dated Jul. 25, 2023 (with English translation, 9 pages).

* cited by examiner

METHODS, APPARATUS AND SYSTEMS FOR TRANSMITTING SIGNAL AND CHANNEL INFORMATION

CROSS-REFERENCE TO RELATED APPLICATION

This application claims the benefit of priority under 35 U.S.C. § 120 as a continuation of PCT Patent Application No. PCT/CN2018/095930, filed on Jul. 17, 2018, the disclosure of which is incorporated herein by reference in its entirety.

TECHNICAL FIELD

The disclosure relates generally to wireless communications and, more particularly, to methods, apparatus and systems for transmitting signal and channel information in a wireless communication.

BACKGROUND

As the number of applications and services for digital data continues to explode, the demands and challenges placed on network resources and operators will continue to increase. The utilization of the licensed radio spectrum, or spectrum for short, is already close to a saturation point. In addition, use of the licensed spectrum may come with a licensing cost for operators. For some regions with private network deployments, efficient use of the unlicensed spectrum with wider bandwidth (e.g., 80 or 100 MHz), may reduce implementation complexity for both networks and terminals (e.g., user equipment or UE), compared to carriers of smaller bandwidth, when moving to address larger amounts of spectrum.

Operation using unlicensed spectrum and carriers in the 5th Generation mobile communication technology (5G) new radio (NR) network has been studied. For an operation under an unlicensed carrier, as well as a licensed carrier, it is necessary to consider how to perform cell search, synchronization and measurement, and how to send system information. Currently, under NR licensed carriers, SS/PBCH blocks (synchronization signal/physical broadcast channel blocks, abbreviated as SSB) have cell search, synchronization, and measurement functions. Similar to LAA (LTE-assisted access to unlicensed spectrum), one may define a new discovery signal, e.g. discovery reference signal (DRS), for cell search, synchronization and measurement features based on the signal and channel information (e.g. SSB) of the NR network.

Due to the special nature of unlicensed carriers, the transmission of SS/PBCH block and/or discovery signals is subject to uncertainty and is also limited by the rules of the unlicensed spectrum. An improper design of transmission will seriously affect the cell search, synchronization and measurement performances. Existing technologies merely try to improve the transmission opportunities of SS/PBCH blocks and/or discovery signals, without considering how to perform time-frequency synchronization or how to associate with beam or random access channel (RACH).

Thus, existing systems and methods for transmitting signal and channel information in a wireless communication are not entirely satisfactory.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a wireless communication node is disclosed. The method comprises: determining a first time domain position associated with a transmission of a first block according to a first configuration; and transmitting a second block at the first time domain position according to a second configuration, wherein the second configuration is different from the first configuration.

In another embodiment, a method performed by a wireless communication device is disclosed. The method comprises: receiving a first block transmitted at a first time domain position according to a first configuration, wherein the first time domain position is associated with a transmission of a second block according to a second configuration, and the second configuration is different from the first configuration.

In a different embodiment, a wireless communication node configured to carry out a disclosed method in some embodiment is disclosed.

In yet another embodiment, a wireless communication device configured to carry out a disclosed method in some embodiment is disclosed.

In still another embodiment, a non-transitory computer-readable medium having stored thereon computer-executable instructions for carrying out a disclosed method in some embodiment is disclosed.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EXEMPLARY EMBODIMENTS

Figure 1:
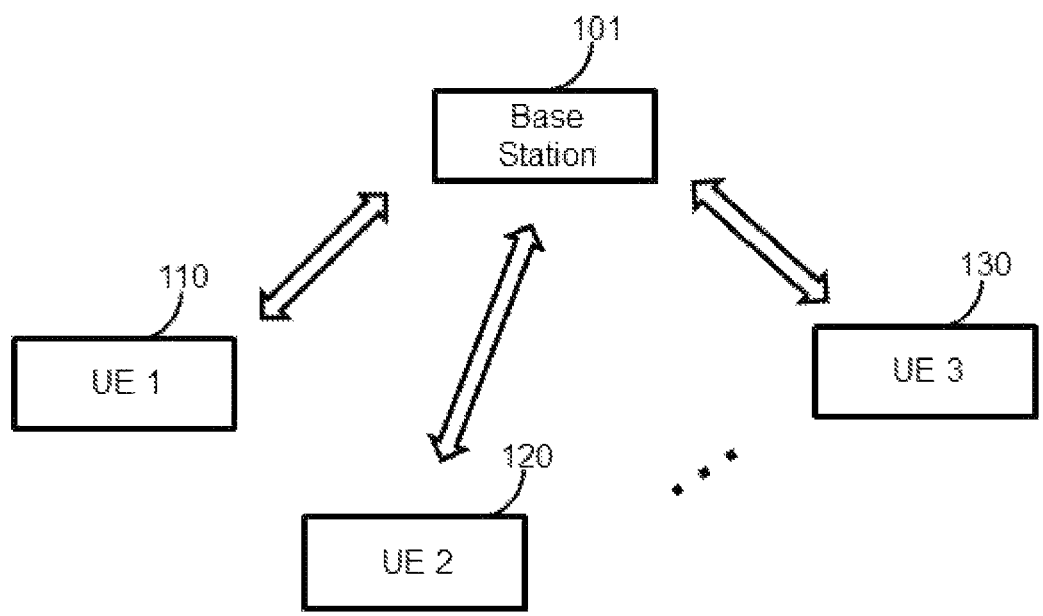
FIG. 1 illustrates an exemplary communication network in which techniques disclosed herein may be implemented, in accordance with an embodiment of the present disclosure.

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

A typical wireless communication network includes one or more base stations (typically known as a "BS") that each provides geographical radio coverage, and one or more wireless user equipment devices (typically known as a "UE") that can transmit and receive data within the radio coverage. In the wireless communication network, a BS and a UE can communicate with each other via a communication link, e.g., via a downlink radio frame from the BS to the UE or via an uplink radio frame from the UE to the BS.

A BS and a UE may communicate under unlicensed carriers in NR. In some countries and regions, there are corresponding regulatory policies for the use of unlicensed spectrum. For example, a device must perform Listen Before Talk (LBT), also known as Clear Channel Assessment (CCA), before sending data using an unlicensed carrier. As such, only LBT-enabled devices can send data on the unlicensed carrier. Under NR licensed carriers, SS/PBCH blocks (SSB) have cell search, synchronization, and measurement functions. Specifically, the primary synchronization signal (PSS) and/or secondary synchronization signal (SSS) in SSB can be used for cell search and time synchronization; SSS in SSB may be used for layer 3 radio resource management (RRM) measurement in an idle or inactive or connected state and can also be used for layer 1 reference signal received power (RSRP) measurement for beam management. In addition, SSB also includes physical broadcast channel (PBCH) that carries master information block (MIB) information. Due to the special nature of unlicensed carriers, such as the need to perform LBT before sending data, the transmission of SS/PBCH block and/or discovery signals faces uncertainty and is also limited by the rules of the unlicensed spectrum.

The present disclosure provides methods and apparatus for transmitting signal and channel information in a wireless communication system, to improve the transmission opportunity of the signal and channel information while ensuring fairness of transmission, without affecting the time and frequency synchronization of the UE or the association with the beam or RACH. In one embodiment, the signal and channel information includes at least an SS/PBCH block or a discovery reference signal (DRS). The transmission scheme provided in the present teaching greatly increases the flexibility of signal transmission compared with existing work and simultaneously solves the problem of time-frequency synchronization and the association with beam or RACH. As such, the transmission scheme in the present teaching is not limited to SS/PBCH block or DRS, and can be applied to both licensed and unlicensed carrier scenarios.

In various embodiments, a BS in the present disclosure can be referred to as a network side and can include, or be implemented as, a next Generation Node B (gNB), an E-UTRAN Node B (eNB), a Transmission/Reception Point (TRP), an Access Point (AP), etc.; while a UE in the present disclosure can be referred to as a terminal and can include, or be implemented as, a mobile station (MS), a station (STA), etc. A BS and a UE may be described herein as non-limiting examples of "wireless communication nodes," and "wireless communication devices" respectively, which can practice the methods disclosed herein and may be capable of wireless and/or wired communications, in accordance with various embodiments of the present disclosure.

FIG. 1 illustrates an exemplary communication network 100 in which techniques disclosed herein may be implemented, in accordance with an embodiment of the present disclosure. As shown in FIG. 1, the exemplary communication network 100 includes a base station (BS) 101 and a plurality of UEs, UE 1 110, UE 2 120 ... UE 3 130, where the BS 101 can communicate with the UEs according to wireless protocols. The BS 101 and a UE, e.g. UE 1 110, may communicate with each other either under a licensed spectrum or under an unlicensed spectrum. The BS 101 may determine a first time domain position associated with a transmission of a first block according to a first configuration, and then transmit a second block at the first time domain position according to a second configuration. Each configuration comprises an index and/or a beam associated with a block transmission. In one embodiment, the second configuration is different from the first configuration. For example, the BS 101 can transmit a block with index number i at a time domain position i+n to the UE, while the block with index number i is associated with a time domain position i; or the BS 101 can transmit a block with index number i+n at the time domain position i+n with a beam i to the UE, while the block with index number i+n is associated with a beam i+n. That is, there is a time domain offset associated with the transmission of the block. In various embodiments, the BS 101 may notify the UE about the time domain offset such that the UE can perform proper synchronization and resource management measurements based on the time domain offset.

Figure 2:
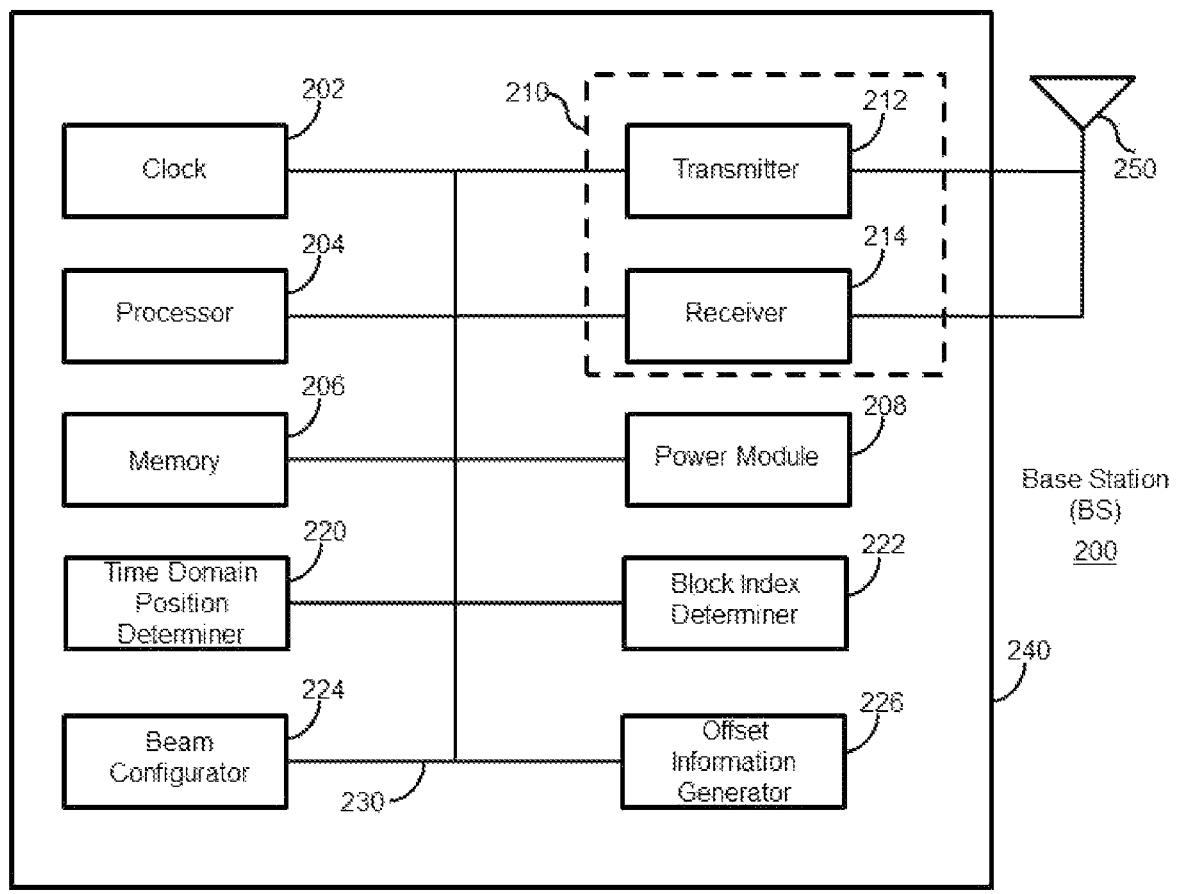
FIG. 2 illustrates a block diagram of a base station (BS), in accordance with some embodiments of the present disclosure.

FIG. 2 illustrates a block diagram of a base station (BS) 200, in accordance with some embodiments of the present disclosure. The BS 200 is an example of a device that can be configured to implement the various methods described herein. As shown in FIG. 2, the BS 200 includes a housing 240 containing a system clock 202, a processor 204, a memory 206, a transceiver 210 comprising a transmitter 212 and receiver 214, a power module 208, a time domain position determiner 220, a block index determiner 222, a beam configurator 224, and an offset information generator 226.

In this embodiment, the system clock 202 provides the timing signals to the processor 204 for controlling the timing of all operations of the BS 200. The processor 204 controls the general operation of the BS 200 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 206, which can include both read-only memory (ROM) and random access memory (RAM), can provide instructions and data to the processor 204. A portion of the memory 206 can also include non-volatile random access memory (NVRAM). The processor 204 typically performs logical and arithmetic operations based on program instructions stored within the memory 206. The instructions (a.k.a., software) stored in the memory 206 can be executed by the processor 204 to perform the methods described herein. The processor 204 and memory 206 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 210, which includes the transmitter 212 and receiver 214, allows the BS 200 to transmit and receive data to and from a remote device (e.g., the BS or another UE). An antenna 250 is typically attached to the housing 240 and electrically coupled to the transceiver 210. In various embodiments, the BS 200 includes (not shown) multiple transmitters, multiple receivers, and multiple transceivers. In one embodiment, the antenna 250 is replaced with a multi-antenna array 250 that can form a plurality of beams each of which points in a distinct direction. The transmitter 212 can be configured to wirelessly transmit packets having different packet types or functions, such packets being generated by the processor 204. Similarly, the receiver 214 is configured to receive packets having different packet types or functions, and the processor 204 is configured to process packets of a plurality of different packet types. For example, the processor 204 can be configured to determine the type of packet and to process the packet and/or fields of the packet accordingly.

In a wireless communication, the BS 200 may transmit data or channel blocks under either licensed spectrum or unlicensed spectrum. For transmissions under licensed spectrum, each block with a given index number is transmitted at a corresponding time domain position. That is, there is a one-to-one mapping between index numbers of transmitted blocks and transmission time domain positions under licensed spectrum, such that once a UE identifies an index number of a block received from the BS, the UE can determine the time domain position at which the block was transmitted. The UE can then perform synchronization and RACH association based on the time domain position for the transmission under licensed spectrum.

Each block to be transmitted under unlicensed spectrum needs an enabled and successful LBT in advance. As such, under unlicensed spectrum, there is no guarantee that a block with a given index can be transmitted at a corresponding or specific time domain position, and there is no one-to-one mapping between index numbers of transmitted blocks and transmission time domain positions under unlicensed spectrum. The BS 200 in this case can notify the UE about the time domain position by sending e.g. a time domain offset as discussed in detail below.

In one embodiment, the time domain position determiner 220 may determine a first time domain position associated with a transmission of a first block according to a first configuration. The BS 200 can transmit, via the transmitter 212, a second block at the first time domain position according to a second configuration. The second configuration may be different from the first configuration. In one example, the first configuration comprises information related to as least one of: a first index number of the first block and a first beam direction for transmitting the first block under a licensed spectrum; and the second configuration comprises information related to as least one of: a second index number of the second block and a second beam direction for transmitting the second block under an unlicensed spectrum. The second configuration is different from the first configuration by at least one of: the first index number is different from the second index number; or the first beam direction is different from the second beam direction. In one embodiment, the first block and the second block are synchronization signal physical broadcast channel (SS/PBCH) blocks. The BS 200 can transmit multiple SS/PBCH blocks at the first time domain position according to different configurations respectively.

Each configuration here may comprise an index number of the transmitted block and a beam for transmitting the block. The block index determiner 222 in this example can generate or determine an index number for each block to be transmitted. The beam configurator 224 in this example can configure a beam for transmitting each block. That is, the block index determiner 222 and the beam configurator 224 can together generate a configuration for block transmission.

The BS 200 may send the time domain position for each block transmitted to the UE that receives the block. In one embodiment, the time domain position determiner 220 can transmit, via the transmitter 212, a flag indicator to indicate the first time domain position or a second time domain position associated with the second block. In other embodiments, the time domain position determiner 220 can send the determined time domain position to the offset information generator 226 for generation of an offset.

The offset information generator 226 in this example receives the time domain position from the time domain position determiner 220 and generates offset information to indicate the time domain position. In one embodiment, the offset information generator 226 can transmit, via the transmitter 212, a time domain offset to the UE that receives the second block. The UE can then identify the first time domain position based on an index number of the second block and the time domain offset, and identify an index number of the first block based on an index number of the second block and the time domain offset. The UE may perform synchronization based on the identified first time domain position and/or the identified index number of the first block. The UE may also perform a random access procedure on a random access channel (RACH) resource associated with the index number of the second block; and perform at least one radio resource management (RRM) measurement according to the index number of the second block.

The time domain offset in this example may refer to at least one of: an offset of the first time domain position relative to a starting position of a transmission window for transmitting the second block; an offset of the first time domain position relative to a starting position of a burst set comprising the second block; an offset of the first time domain position relative to a time domain position associated with the second block; an offset of the first time domain position relative to an index number of the second block; and an offset of the index number of the first block to the index number of the second block. The time domain offset may be represented by at least one of: a sub-frame; a time slot; a symbol; a difference between index numbers of time domain positions; a difference between numbers of blocks; and a difference between index numbers of blocks. According to various embodiments, the time domain offset is carried by at least one of: a master information block (MIB); a physical broadcast channel (PBCH) payload; a PBCH generation sequence; a PBCH scrambling sequence; a generation sequence of demodulation reference signal (DMRS) associated with the PBCH; and a scrambling sequence of DMRS associated with the PBCH. The UE can obtain the time domain offset based on a demodulation of at least one of the above information or sequences.

In another embodiment, the offset information generator 226 can generate a frequency domain offset between a frequency position of the second block and a frequency domain reference location, e.g. the absolute radio frequency channel number (ARFCN). The offset information generator 226 then transmits, via the transmitter 212, the frequency domain offset to the UE that receives the second block. The UE can detect the frequency domain offset based on a demodulation of at least one of: a master information block (MIB), a physical broadcast channel (PBCH) payload, a PBCH generation sequence, a PBCH scrambling sequence, a generation sequence of DMRS associated with the PBCH, and a scrambling sequence of DMRS associated in the PBCH. The UE can then determine a time domain offset based on the detected frequency domain offset.

In one embodiment, the first block is associated with a first index number determined by the block index determiner 222 and is transmitted based on a first beam configured by the beam configurator 224; the second block has the first index number and is configured for transmission based on a second beam by the beam configurator 224. In this example, the time domain offset can be an index offset between the second beam and the first beam. The time domain offset may be represented by a difference between index numbers of beams.

In one embodiment, the block index determiner 222 can determine a maximum number L of beams configured for block transmission in a transmission window or a burst set, and notify the maximum number L to the UE, such that for each transmitted block having an index number i, the UE can identify a beam that has an index number x=i mod L and is associated with the transmitted block.

The power module 208 can include a power source such as one or more batteries, and a power regulator, to provide regulated power to each of the above-described modules in FIG. 2. In some embodiments, if the BS 200 is coupled to a dedicated external power source (e.g., a wall electrical outlet), the power module 208 can include a transformer and a power regulator.

The various modules discussed above are coupled together by a bus system 230. The bus system 230 can include a data bus and, for example, a power bus, a control signal bus, and/or a status signal bus in addition to the data bus. It is understood that the modules of the BS 200 can be operatively coupled to one another using any suitable techniques and mediums.

Although a number of separate modules or components are illustrated in FIG. 2, persons of ordinary skill in the art will understand that one or more of the modules can be combined or commonly implemented. For example, the processor 204 can implement not only the functionality described above with respect to the processor 204, but also implement the functionality described above with respect to the offset information generator 226. Conversely, each of the modules illustrated in FIG. 2 can be implemented using a plurality of separate components or elements.

Figure 3:
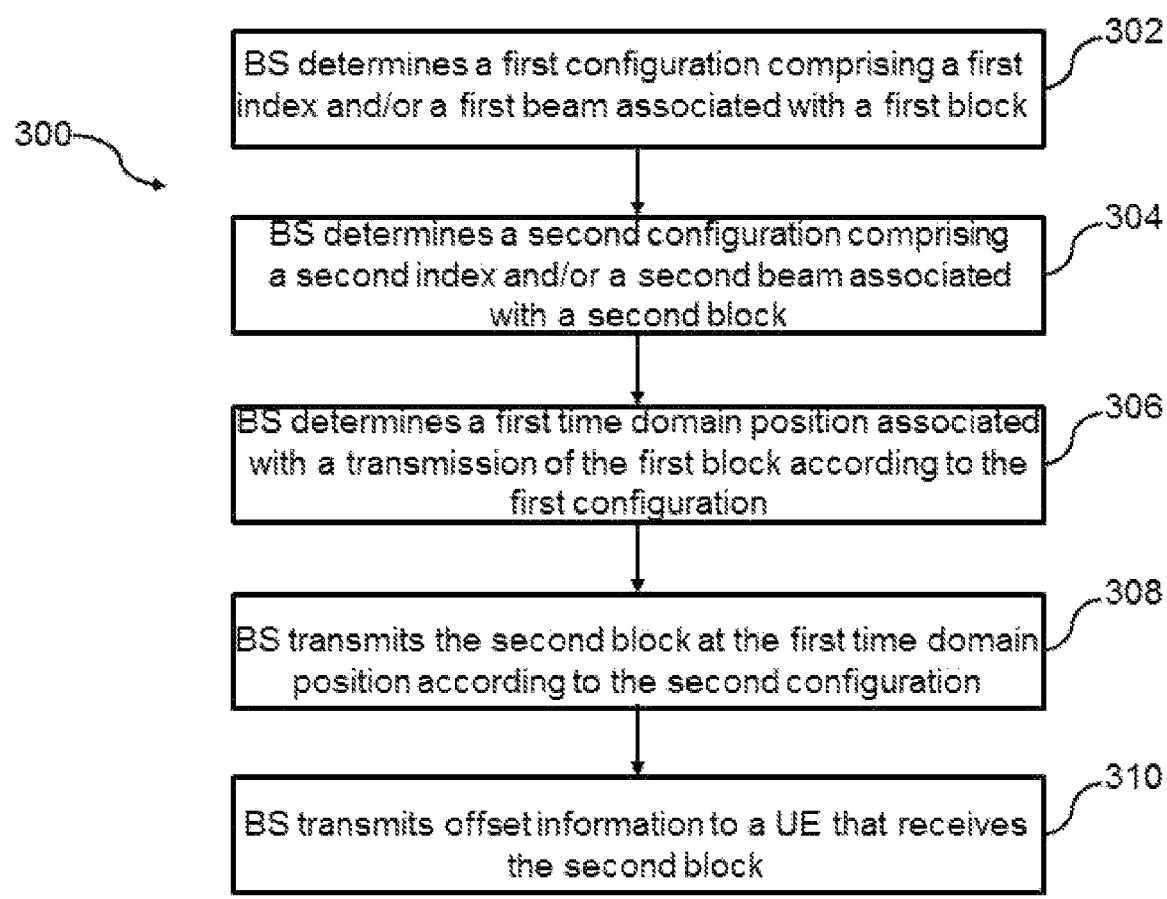
FIG. 3 illustrates a flow chart for a method performed by a BS for transmitting signal and channel information in a wireless communication, in accordance with some embodiments of the present disclosure.

FIG. 3 illustrates a flow chart for a method 300 performed by a BS, e.g. the BS 200 in FIG. 2, for transmitting signal and channel information in a wireless communication, in accordance with some embodiments of the present disclosure. At operation 302, the BS determines a first configuration comprising a first index and/or a first beam associated with a first block. At operation 304, the BS determines a second configuration comprising a second index and/or a second beam associated with a second block. At operation 306, the BS determines a first time domain position associated with a transmission of the first block according to the first configuration. At operation 308, the BS transmits the second block at the first time domain position according to the second configuration. At operation 310, the BS transmits offset information to a UE that receives the second block.

Figure 4:
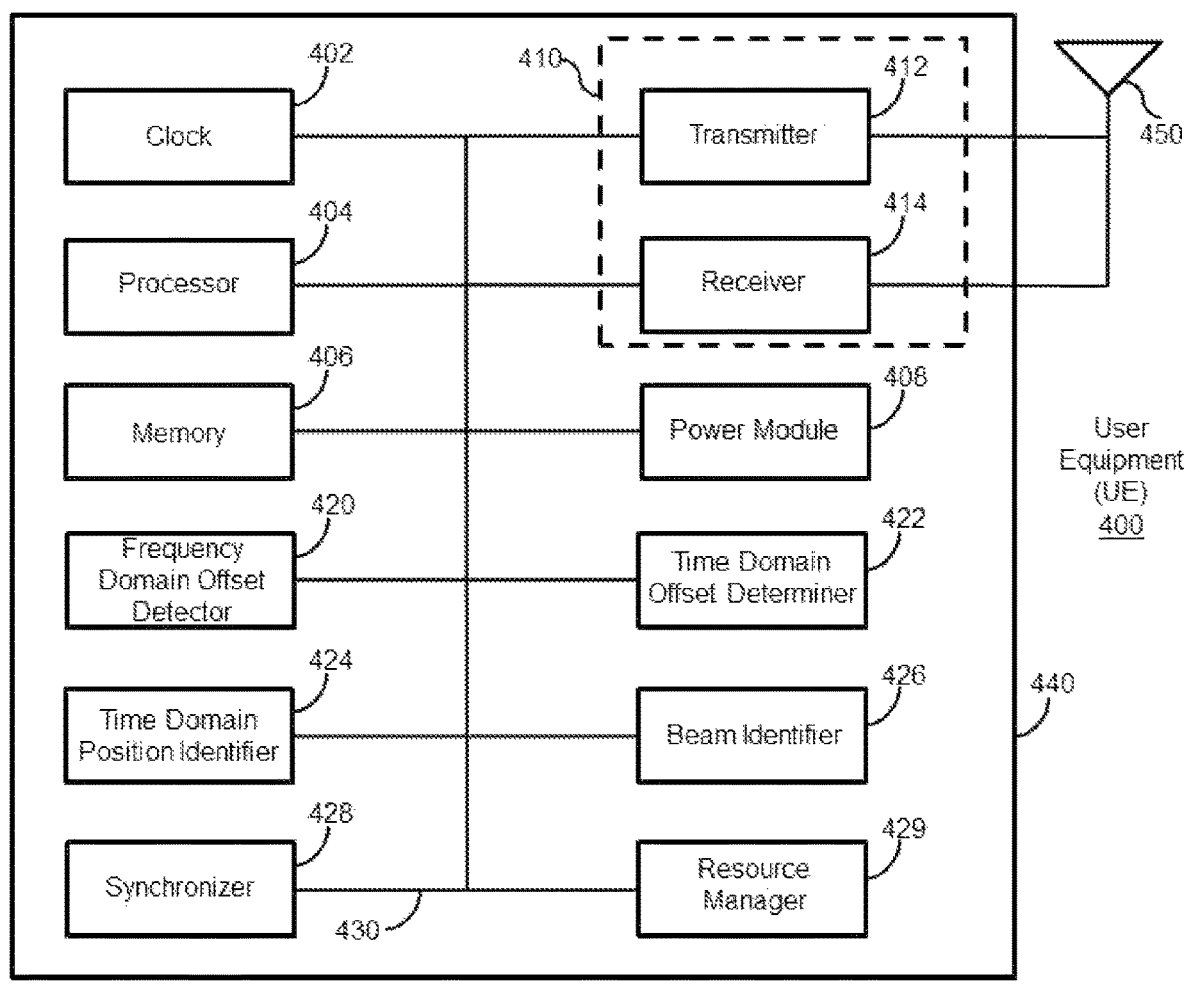
FIG. 4 illustrates a block diagram of a user equipment (UE), in accordance with some embodiments of the present disclosure.

FIG. 4 illustrates a block diagram of a UE 400, in accordance with some embodiments of the present disclosure. The UE 400 is an example of a device that can be configured to implement the various methods described herein. As shown in FIG. 4, the UE 400 includes a housing 440 containing a system clock 402, a processor 404, a memory 406, a transceiver 410 comprising a transmitter 412 and a receiver 414, a power module 408, a frequency domain offset detector 420, a time domain offset determiner 422, a time domain position identifier 424, a beam identifier 426, a synchronizer 428, and a resource manager 429.

In this embodiment, the system clock 402, the processor 404, the memory 406, the transceiver 410 and the power module 408 work similarly to the system clock 202, the processor 204, the memory 206, the transceiver 210 and the power module 208 in the BS 200. An antenna 450 or a multi-antenna array 450 is typically attached to the housing 440 and electrically coupled to the transceiver 410.

The frequency domain offset detector 420 in this example may detect a frequency domain offset between a frequency position of the second block and a frequency domain reference location based on a demodulation of at least one of: a master information block (MIB), a physical broadcast channel (PBCH) payload, a PBCH generation sequence, a PBCH scrambling sequence, a generation sequence of DMRS associated with the PBCH, and a scrambling sequence of DMRS associated in the PBCH, transmitted from a BS. The time domain offset determiner 422 can then determine a time domain offset based on the detected frequency domain offset.

The frequency domain offset detector 420 is optionally in the UE 400. When there is no frequency domain offset detector 420, the time domain offset determiner 422 can receive a time domain offset from a BS that transmits the first block. In various embodiments, the time domain offset refers to at least one of: an offset of the first time domain position relative to a starting position of a transmission window for transmitting the first block; an offset of the first time domain position relative to a starting position of a burst set comprising the first block; an offset of the first time domain position relative to a time domain position associated with the first block; an offset of the first time domain position relative to an index number of the first block; and an offset of the index number of the first block to the index number of the second block. The time domain offset may be represented by at least one of: a sub-frame; a time slot; a symbol; a difference between index numbers of time domain positions; a difference between numbers of blocks; and a difference between index numbers of blocks. The time domain offset may be received based on a demodulation of at least one of: a master information block (MIB); a physical broadcast channel (PBCH) payload; a PBCH generation sequence; a PBCH scrambling sequence; a generation sequence of demodulation reference signal (DMRS) associated with the PBCH; and a scrambling sequence of DMRS associated with the PBCH. In one embodiment, the first block and the second block are synchronization signal physical broadcast channel (SS/PBCH) blocks.

The time domain position identifier 424 in this example receives, via the receiver 414, a first block transmitted at a first time domain position according to a first configuration. The first time domain position is associated with a transmission of a second block according to a second configuration, and the second configuration is different from the first configuration. In one example, the first configuration comprises information related to as least one of: a first index number of the first block and a first beam direction for transmitting the first block under an unlicensed spectrum; and the second configuration comprises information related to as least one of: a second index number of the second block and a second beam direction for transmitting the second block under a licensed spectrum. The second configuration is different from the first configuration by at least one of: the first index number is different from the second index number; and the first beam direction is different from the second beam direction. In one embodiment, the time domain position identifier 424 may receive multiple blocks at the first time domain position according to various configurations.

The time domain position identifier 424 can identify index numbers of blocks. In one embodiment, the time domain position identifier 424 may identify the first time domain position based on an index number of the first block and the time domain offset determined by the time domain offset determiner 422. The time domain position identifier 424 may also identify an index number of the first block based on an index number of the second block and the time domain offset. In another embodiment, the time domain position identifier 424 may receive a flag indicator associated with the first block and identify, based on the flag indicator, the first time domain position or a second time domain position associated with the first block.

The beam identifier 426 in this example can identify beams used for transmitting the blocks. In one embodiment, the first block is associated with a first index number and is transmitted based on a first beam; and the second block has the first index number and is configured for transmission based on a second beam. In one embodiment, the time domain offset determined by the time domain offset determiner 422 may refer to an index offset between the first beam and the second beam; and the time domain offset may be represented by a difference between index numbers of beams. In one embodiment, the beam identifier 426 can determine a maximum number L of beams configured for block transmission in a transmission window or a burst set; and identify, for each transmitted block having an index number i, a beam that has an index number x=i mod L and is associated with the transmitted block.

The time domain position identifier 424 may send the identified first time domain position and/or the identified index number of the first block to the synchronizer 428 and the resource manager 429. The synchronizer 428 in this example may perform synchronization based on the identified first time domain position and/or the identified index number of the first block. The resource manager 429 in this example may perform a random access procedure on a random access channel (RACH) resource associated with the index number of the first block and perform at least one radio resource management (RRM) measurement according to the index number of the first block.

The various modules discussed above are coupled together by a bus system 430. The bus system 430 can include a data bus and, for example, a power bus, a control signal bus, and/or a status signal bus in addition to the data bus. It is understood that the modules of the UE 400 can be operatively coupled to one another using any suitable techniques and mediums.

Although a number of separate modules or components are illustrated in FIG. 4, persons of ordinary skill in the art will understand that one or more of the modules can be combined or commonly implemented. For example, the processor 404 can implement not only the functionality described above with respect to the processor 404, but also implement the functionality described above with respect to the time domain offset determiner 422. Conversely, each of the modules illustrated in FIG. 4 can be implemented using a plurality of separate components or elements.

Figure 5:
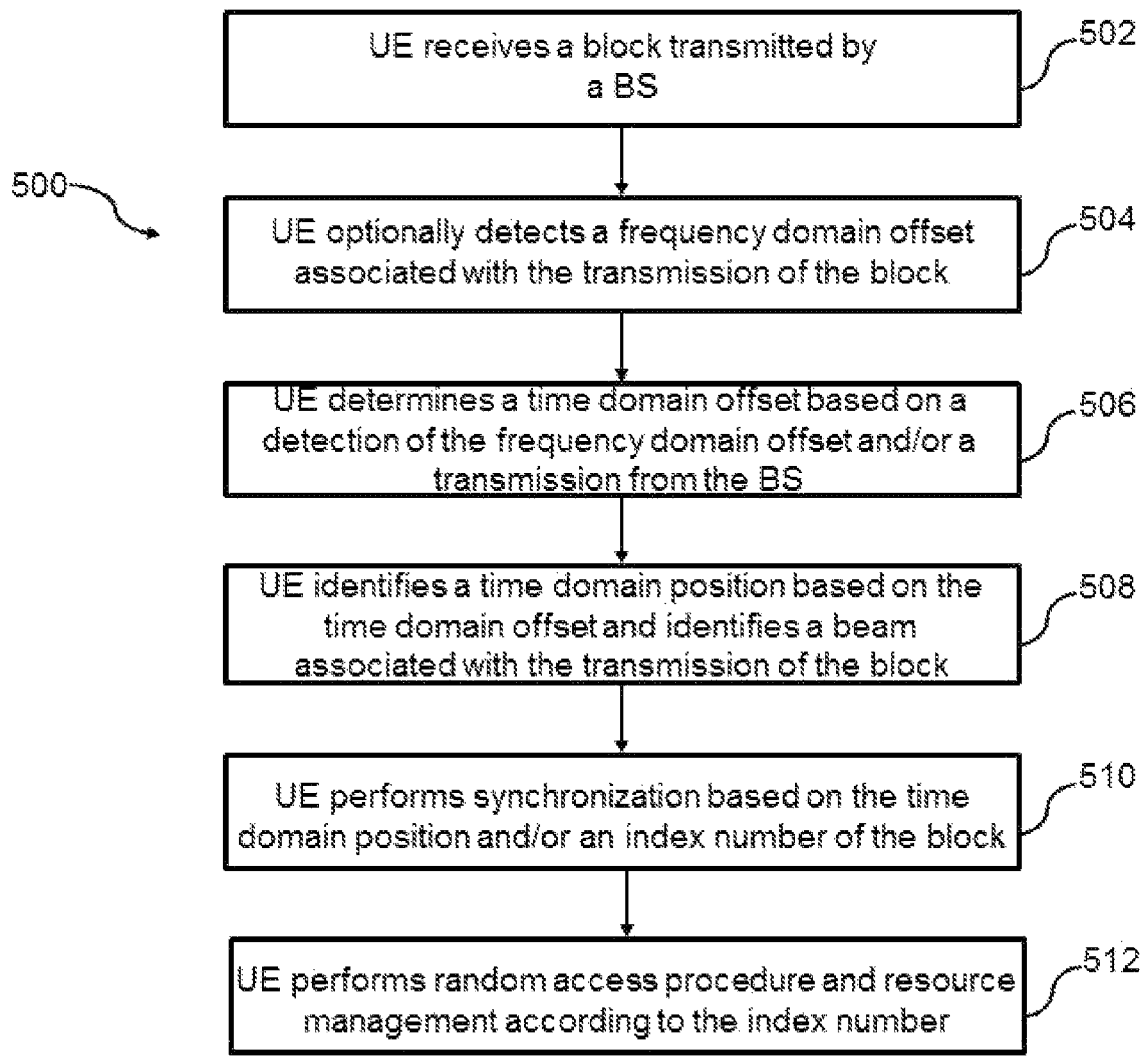
FIG. 5 illustrates a flow chart for a method performed by a UE for receiving signal and channel information in a wireless communication, in accordance with some embodiments of the present disclosure.

FIG. 5 illustrates a flow chart for a method 500 performed by a UE, e.g. the UE 400 in FIG. 4, for receiving signal and channel information in a wireless communication, in accordance with some embodiments of the present disclosure. At operation 502, the UE receives a block transmitted by a BS. Optionally at operation 504, the UE detects a frequency domain offset associated with the transmission of the block. At operation 506, the UE determines a time domain offset based on a detection of the frequency domain offset and/or a transmission from the BS. At operation 508, the UE identifies a time domain position based on the time domain offset and identifies a beam associated with the transmission of the block. At operation 510, the UE performs synchronization based on the time domain position and/or an index number of the block. At operation 512, the UE performs random access procedure and resource management according to the index number.

Different embodiments of the present disclosure will now be described in detail hereinafter. It is noted that the features of the embodiments and examples in the present disclosure may be combined with each other in any manner without conflict.

Figure 6:
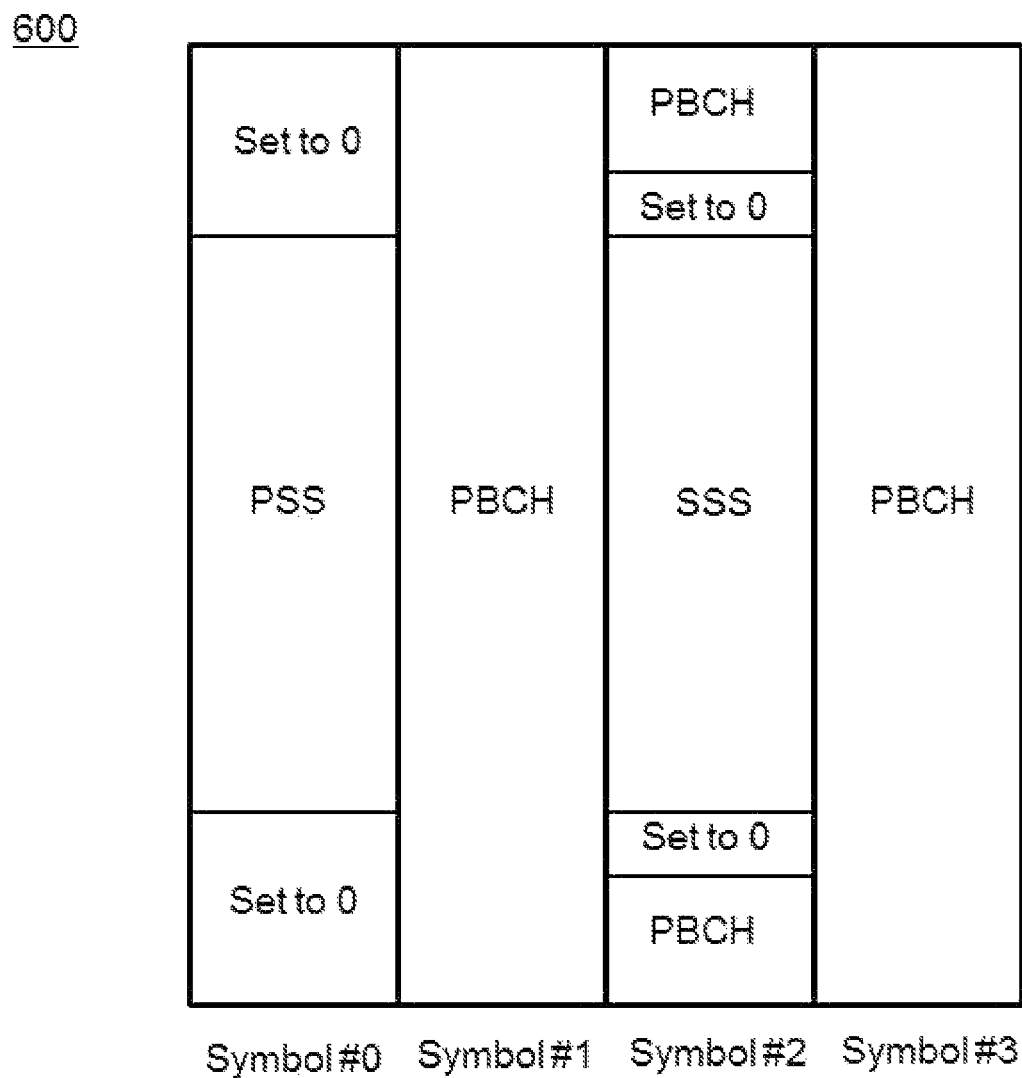
FIG. 6 illustrates an exemplary block to be transmitted, in accordance with an embodiment of the present disclosure.

For ease of description, the SS/PBCH block will be taken as an example in the following description to give a scheme to improve the SS/PBCH block transmission opportunity and solve the corresponding time-frequency synchronization and beam (or RACH) association problem. In one embodiment, the SS/PBCH block (i.e., SSB) in the present teaching may correspond to the SS/PBCH block defined in 3GPP TS 38.211/213-f00. The SSB mainly includes PSS, SSS, PBCH, and related DMRS. As shown in FIG. 6, a SSB 600 occupies 4 OFDM symbols in the time domain and 240 REs in the frequency domain.

Multiple SS/PBCH blocks are distributed in one SS/PBCH block transmission window or an SS/PBCH block burst set. A block transmission window may be a half-frame length defined by 3GPP 38.213, i.e., 5 ms. The maximum number of SS/PBCH blocks is related to the carrier frequency. For example, when the carrier frequency is 3 GHz or below, the maximum SS/PBCH block number L is 4;

when the carrier frequency is 6 GHz or below, the maximum SS/PBCH block number L is 8; when the carrier frequency is 6 GHz or above, the maximum number of SS/PBCH blocks L is 64.

The SS/PBCH block is numbered from 0 to L-1 in the transmission window (half-frame length) or the SS/PBCH block burst set. Each numbered SS/PBCH block corresponds to a fixed time domain location in the half-frame. For example, SS/PBCH block index i (index can be deleted) is located in the time frame position i in the half frame. That is, SS/PBCH block index 0 is located in the time domain position 0; SS/PBCH block index 1 is located in the time domain position 1 . . . SS/PBCH block index L-1 is located in the time domain position L-1. The time domain position i refers to the time domain location i for transmitting SS/PBCH block index i within the SS/PBCH block transmission window (length half-frame) or SS/PBCH block burst set. The time domain location 0 to the time domain location L-1 are located in different time domain locations within the transmit window or burst set. For example, at a carrier frequency of 3 GHz or below, four SS/PBCH blocks (numbered from 0 to 3) are respectively placed in four fixed time-domain positions within the transmit window.

For a transmission under a licensed spectrum, the two concepts of index and time-domain position of the SS/PBCH block are essentially the same and may not be distinguished. Knowing the index of the SS/PBCH block, a device knows its time-domain position within the 5 ms transmission window or burst set. Introducing the time domain location here is to set a flexible SS/PBCH block transmission location.

Figure 7:
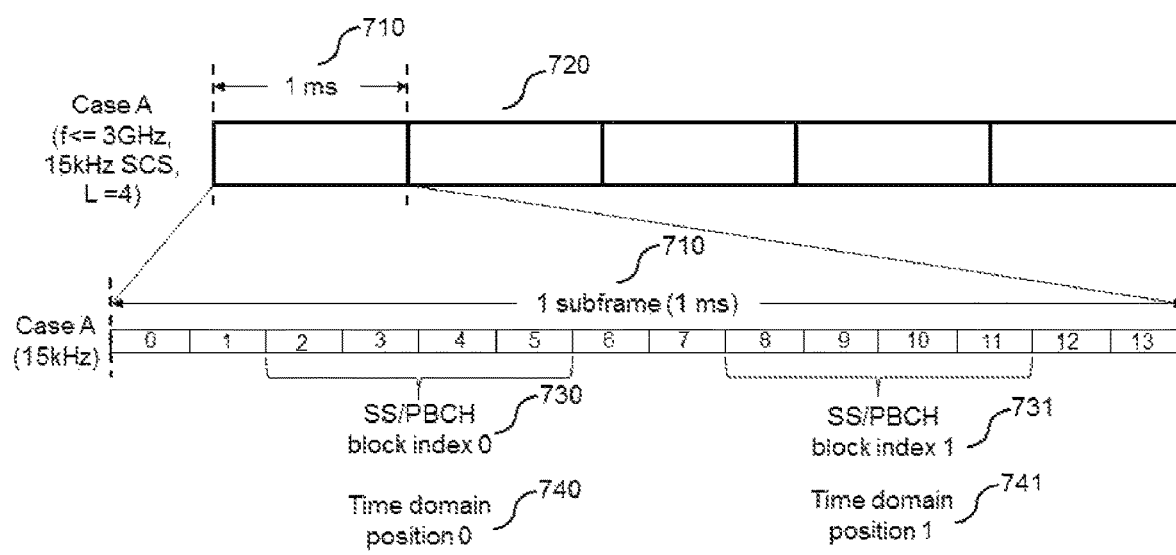
FIG. 7 illustrates an exemplary configuration for transmitting signal and channel information, in accordance with an embodiment of the present disclosure.

In one embodiment, the pattern of SS/PBCH block includes Case A/B/C/D/E for a total of 5 Cases. Taking Case A as an example, the sub-carrier spacing (SCS) is 15 kHz. Case A's carrier frequency can be 3 GHz and below, or it can be between 3 GHz and 6 GHz. Taking the carrier frequency at 3 GHz and below as an example, the maximum number L of SS/PBCH blocks is 4. As shown in FIG. 7, in the half-frame window, four SS/PBCH blocks are distributed in the first two slots 710, 720 (i.e., within the first 2 ms), and two SS/PBCH blocks are distributed in each slot. In the half-frame window, the index numbers of the four SS/PBCH blocks are 0, 1, 2, and 3 in order. The time domain locations for transmitting these four SS/PBCH blocks are 0, 1, 2, and 3, respectively.

In order to increase the transmission opportunity of the SS/PBCH, a method is proposed here to configure and transmit one or more SS/PBCH blocks in the same time domain location. For example, the SS/PBCH block index i may be defined or configured for transmission at the time domain position i+n. Alternatively, SS/PBCH block index i and SS/PBCH block index i+n may be both configured at the time-domain position i+n.

The time-domain position i+n refers to the time-domain position originally for transmitting the SS/PBCH block index i+n within the SS/PBCH block transmission window or within the SS/PBCH block burst set, i.e., the time domain position for transmitting the SS/PBCH block index i+n in prior art or in licensed spectrum. For example, in FIG. 7 (assuming i=0, n=1), in the time domain position 1 741 (original SS/PBCH block index 1 position, similar below), the system can define or configure to transmit SS/PBCH block index 0 730, or define or configure to send SS/PBCH block index 0 and SS/PBCH block index 1 731 (that is, i=0, n=1).

Alternatively, the time-domain position i+n refers to the time-domain position of the SS/PBCH block that is newly defined or configured in the SS/PBCH block transmission window or within the SS/PBCH block burst set. For example, as shown in FIG. 7, the SS/PBCH blocks 0-3 are respectively transmitted in the time domain positions 0-3 originally defined in the first 2 ms of the half-frame window. Then the last 3 ms in the half-frame window can be newly defined to send SS/PBCH block positions, e.g. time domain position 4 and time domain position 5. In one embodiment, i is an integer greater than or equal to 0, n is an integer, and i+n is greater than or equal to 0.

When n=0, if i<=L-1, it is the SS/PBCH block transmission configuration defined by the prior art. That is, in the SS/PBCH block transmission window (half-frame length) or the SS/PBCH block burst set, the transmission of SS/PBCH block index i (i<=L-1) is arranged at the time-domain position i.

When n=0, if i>L-1, that is, in the SS/PBCH block transmission window or within the SS/PBCH block burst set, some SS/PBCH transmission positions are newly defined in the time-domain position of the undefined SS/PBCH block. For example, as shown in FIG. 7, the SS/PBCH blocks 0-3 are respectively transmitted in the time domain positions 0-3 originally defined in the first 2 ms in the half-frame window. The last 3 ms in the half-frame window can be newly defined to send SS/PBCH block positions, e.g. the transmission of SS/PBCH block index 4 is configured in the time domain position 4 and the transmission of SS/PBCH block index 5 is configured in the time domain position 5, etc. The scope of the SS/PBCH block index also becomes larger.

When n>0, the SS/PBCH block index i or SS/PBCH block index i+n may be defined or configured at the time-domain position i+n. The time-domain position i+n may be within the SS/PBCH block transmission window or within the SS/PBCH block burst set, originally defined for the time domain position of the SS/PBCH block i+n (i+n<=L-1); and may also be, in the SS/PBCH block transmission window or the SS/PBCH block burst set, the newly defined position of the SS/PBCH block to be transmitted in the time domain position of the undefined SS/PBCH block (i+n>L-1). If i<=L-1, it indicates that the index range of SS/PBCH block transmission does not change within the SS/PBCH block transmission window or SS/PBCH block burst set. For FIG. 7, the index range of sent SS/PBCH blocks is still 0 to L-1 (0 to 3); even in the newly defined time domain position, the index range of sent SS/PBCH blocks is still 0 to L-1. For example, the SS/PBCH block index 0 is configured to transmit in the time domain position 4 and the transmission of SS/PBCH block index 1 is configured in the time domain position 5, etc. If i>L-1, it indicates that the index range of the SS/PBCH block transmission increases within the SS/PBCH block transmission window or within the SS/PBCH block burst set. This applies in particular to the newly defined positions in the SS/PBCH block transmission window or in the SS/PBCH block burst set for transmitting SS/PBCH blocks in the time domain where the SS/PBCH block is not defined. For example, the SS/PBCH block index 4 is configured to be transmitted at the time domain position 5, etc.

When n<0, the SS/PBCH block index i, i+n<i may be defined or configured at the time-domain position i+n. For example, i=2, n=−1. That is, the SS/PBCH block index 2 can be configured to be transmitted in the time domain position 1. The SS/PBCH block index i can be sent before the originally defined time domain position i.

If the base station adopts a beam based LBT, it tries to perform LBT based on different beams, and the SS/PBCH block is transmitted on a beam on which the LBT is successfully performed. This improves the transmission opportunity of the SS/PBCH. Since the UE is performing time-frequency synchronization based on the SS/PBCH block index and when the SS/PBCH block index is known, the time domain position of the SS/PBCH block is known. But the same SS/PBCH block index may appear in different time domain locations in this method. If the time-frequency synchronization is performed only based on the index number of the SSB received by the UE, there may be a synchronization error. Therefore, it is necessary to consider how to carry the number index of the SS/PBCH block.

In addition, for convenience of description, it is assumed that SS/PBCH block index numbers 0, 1, 2, and 3 are respectively desired to be transmitted on beams 0, 1, 2, and 3, that is, SS/PBCH block index i is desired to be transmitted or associated on beam i. This may be resolved by implementation.

If in the time-domain position i (the SS/PBCH block index i should be sent on the beam i at this position), the base station fails to perform LBT in the beam i direction, then the transmission of the SS/PBCH block index i fails. Then if in the time-domain position i+n (the SS/PBCH block index i+n should be sent on the beam i+n at this position), the base station successfully performs LBT in the beam i direction (suppose LBT failed in beam i+n direction), there may be different situations.

In one situation, when the base station sends the SS/PBCH block index i on beam i, it will cause the UE to perform time-frequency synchronization in error. The UE will determine that the SS/PBCH block index i is sent in the time domain position i instead of the time domain position i+n. The UE does not think that the same SSB, such as SS/PBCH block index i, is sent by a different beam. It is actually sent by the same beam. In other words, the UE assumes that the same SSB, for example, SS/PBCH block index i, is always sent from the same beam. Therefore, the base station and the UE have the same knowledge of the beam. There is no problem with the association between Beam and SSB.

In another situation, when the base station sends the SS/PBCH block index i+n on beam i, the time-frequency synchronization of the UE has no problem because the SS/PBCH block index i+n originally corresponds to the time-domain position i+n. The UE knows that the SS/PBCH block number index i+n knows the time-domain position i+n. However, the base station and the UE are confused about the beam. In the initial access phase, the UE sends the RACH according to the RACH resources (including time-frequency resources and preambles) corresponding to the SS/PBCH block index i+n, and the base station receives the RACH according to the received information. The BS determines which SS/PBCH block (i.e., index i+n) is selected by the UE, and accordingly which beam (i.e., beam i) is selected by the UE. This process is transparent to the UE, and the base station does not misjudge. If it has been such a process, there is no problem. However, the base station may subsequently send the SS/PBCH block index i+n on beam i+n. That is, SS/PBCH blocks of the same index may be transmitted by different beams (or SS/PBCH blocks of different index may be transmitted by the same beam). This will cause the UE and the base station to misunderstand the association between the beam and the SSB. For example, the UE may filter all SS/PBCH block i+n measurement results of the same sequence number and report the result to the base station. The UE understands that these are all transmitted by the same beam, but in reality they are sent by different beams. As such, in a proposed method, the UE does not consider that the same SSB, for example, SS/PBCH block index i, is always transmitted from the same beam, or that the UE will assume that SS/PBCH blocks of different index numbers may be transmitted by the same beam.

If the base station adopts omnidirectional LBT, the same problem exists when the base station can send one SS/PBCH block or multiple SS/PBCH blocks after the success of LBT. For example, as shown in FIG. 7, when the base station fails to perform LBT at or before the time domain position 0 740 (that is, the original SS/PBCH block index 0 position, as shown in FIG. 7, the same applies hereinafter), it will cause a failure of the transmission of SS/PBCH block index 0 730. Further, the base station fails to send the SS/PBCH block index 0 730 on the beam 0. At the beginning or before the time domain position 1 741 (that is, the original SS/PBCH block index 1 position, as shown in FIG. 7), the base station tries again to perform LBT and transmits SS/PBCH block index 0 and/or 1. Further, the base station re-attempts to send SS/PBCH block index 0 730 and/or 1 731 on beam 0 in the time domain position 1 741. Alternatively, the base station attempts to send SS/PBCH block index 1 731 on beam 1 in time domain position 1 741. The present teaching is mainly directed to the former case and provides a solution. The following embodiments may be performed independently or freely in combination. The technical points in one embodiment may be applied to another embodiment.

In a first embodiment, the SS/PBCH block index i is transmitted in the time domain position i+n, that is, the index of the SS/PBCH block is i. Optionally, it is assumed that the base station always sends the SS/PBCH block index i on the beam i, that is, it always sends the same numbered SS/PBCH block on the same beam, or, the same numbered SS/PBCH block is always sent on the same beam. The UE assumes the same numbered SSB, for example, the SS/PBCH block index i is always sent by the same beam (e.g., beam i). Therefore, it is assumed that SS/PBCH block index i is transmitted on beam i. The frequency domain position of the SS/PBCH block index i is not constrained or invariable. The SS/PBCH block index i is carried by scrambled sequence or generated sequence in the PBCH and/or the DMRS.

The time domain offset of the SS/PBCH block index i may be notified to the UE. The time domain offset may be a time domain offset of the time domain position i+n relative to the start position of the transmission window or the start position of the burst set, or the offset of the time domain location i+n relative to the original transmission position of the SS/PBCH block index i (i.e. the time domain position i), or the offset of the SS/PBCH block index i+n relative to the sequence number of the SS/PBCH block index i. The offset may be represented by a sub-frame, a time slot, a symbol, or a difference between position numbers (for example, i+n−i as discussed above), or a difference between numbers of SS/PBCH blocks, or a difference between indices of SS/PBCH blocks (for example, i+n−i as described above). The offset may be carried by the MIB, the PBCH payload, the PBCH generation sequence or the scrambling sequence, or the DMRS generation sequence or scrambling sequence in the PBCH. The UE can obtain the offset information according to the demodulation of the above information or sequence.

The UE determines the actual time domain location (time domain location i+n), symbol/time slot location, or the original SS/PBCH sequence number (index i+n) corresponding to this time domain location, according to the index (index i) of the received SS/PBCH block and the time domain offset. The original corresponding SS/PBCH sequence number (index i+n), in order to correctly perform time-frequency synchronization.

The association relationship between the received SS/PBCH block and the RACH does not change, and/or the measurement behavior of the UE based on the received SS/PBCH block does not change. That is, the UE sends RACH on its associated RACH resource according to index i of the received SS/PBCH block. The UE performs corresponding layer 3 radio resource management (L3-RRM) measurement and/or layer 1 radio resource management (L1-RRM) measurement according to index i of the received SS/PBCH block, thereby reporting the correct measurement result.

In a second embodiment, the SS/PBCH block index i+n is transmitted in the time domain position i+n, that is, the index of the SS/PBCH block is i+n. Optionally, the base station sends the SS/PBCH block index i+n on the beam i (assuming that the SS/PBCH block index i+n should always be sent on the associated beam i+n, and SS/PBCH block index i should be sent on the associated beam i). That is, the base station may send SS/PBCH blocks with different index numbers on the same beam, or, the same numbered SS/PBCH block may be sent on different beams.

The UE does not assume that the same numbered SS/PBCH block (e.g., SS/PBCH block index i+n) is always transmitted on the same beam (e.g., beam i+n). In other words, the UE may assume that SS/PBCH blocks of different index numbers may be transmitted by the same beam. Or, the UE will assume that the same beam may send SS/PBCH blocks of different index numbers.

In this embodiment, it is assumed that SS/PBCH block index i+n is transmitted on beam i. The frequency domain position of the SS/PBCH block index i+n is not constrained or invariable. The SS/PBCH block index i+n is carried by scrambled sequence or generated sequence in the PBCH and/or the DMRS.

In order to correctly know the beam i number for sending the SS/PBCH block, the time domain offset of the SS/PBCH block index i+n may be notified to the UE, and the time domain offset may be a time domain offset of the time domain position i+n relative to the start position of the transmission window or the start position of the burst set, or the offset of the time domain location i+n relative to the original transmission position of the SS/PBCH block index i (i.e. the time domain position i), or the offset of the SS/PBCH block index i+n relative to the sequence number of the SS/PBCH block index i, or the index offset between the beam of the SS/PBCH block index i+n transmission and the beam associated with the SS/PBCH block index i+n. The offset may be represented by a sub-frame, a time slot, a symbol, or a difference between position numbers (for example, i+n−i as discussed above), or a difference between numbers of SS/PBCH blocks, or a difference between indices of SS/PBCH blocks (for example, i+n−i as described above), or a difference between indices of beams. The offset may be carried by the MIB, the PBCH payload, the PBCH generation sequence or the scrambling sequence, or the DMRS generation sequence or scrambling sequence in the PBCH. The UE can obtain the offset information according to the demodulation of the above information or sequence.

The UE determines the time domain location (time domain location i+n) or symbol/slot location at this time based on the index (index i+n) of the received SS/PBCH block, in order to correctly perform time-frequency synchronization. The association relationship between the SS/PBCH block (e.g., index i+n) received by the UE and the RACH is unchanged or changed. When the association does not change, the UE sends RACH on its associated RACH resource according to the index (index i+n) of the received SS/PBCH block. When the association changes, the UE determines the SS/PBCH block number (index i) that the base station originally planned to send or the original SS/PBCH block number (index i) that is associated with the beam, according to the received index of the SS/PBCH block (index i+n) and the time domain offset, and sends RACH on its associated RACH resource.

The UE determines the SS/PBCH block number (index i) originally planned to be transmitted by the base station or the original SS/PBCH block number (index i) associated with the beam according to the received index of the SS/PBCH block (index i+n) and the time domain offset (n), to perform the corresponding L3-RRM measurement and/or L1-RRM measurement to report the correct measurement result. That is, the measurement result of the SS/PBCH block index i+n needs to be counted down to the SS/PBCH block index i (associated with beam i).

In a third embodiment, the SS/PBCH block index i is transmitted in the time domain position i+n, that is, the index of the SS/PBCH block is i. Optionally, it is assumed that the base station always sends the SS/PBCH block index i on the beam i, that is, it always sends the same numbered SS/PBCH block on the same beam. Or, the same numbered SS/PBCH block is always sent on the same beam. The UE assumes the same numbered SSB, for example, the SS/PBCH block index i is always sent by the same beam (e.g., beam i). Therefore, it is assumed that SS/PBCH block index i is transmitted on beam i.

The scrambled or generated sequence in the PBCH and/or DMRS carries the SS/PBCH block index number i. For example, in a beam sweeping or non-beam seeping scenario, the SS/PBCH block index i is located in the time domain position i in the half frame, that is, the SS/PBCH block index 0 is located in the time domain position 0; the SS/PBCH block index 1 is located in the time domain position 1; . . . the SS/PBCH block index L-1 is located in the time domain position L-1; the time domain position 0 to the position L-1 are located in different time domain positions in the transmission window or in the burst set.

It is assumed that the above L SS/PBCH blocks are located at f0 in the frequency domain, wherein f0 is a frequency domain reference location, e.g. the absolute radio frequency channel number (ARFCN) of the SS/PBCH block. When SS/PBCH block index i is transmitted in the time-domain position i+n, in order to solve the problem of time-frequency synchronization, a frequency domain offset of SS/PBCH block index i with respect to f0 in the frequency domain may be configured. For example, offset is equal to n*X RE/RB or SS/PBCH blocks, where X is the offset size in the frequency domain where the index offset is 1 (n=1). The unit can be resource element (RE), resource block (RB) or SS/PBCH block. Suppose SS/PBCH block index 0 is sent in the time domain position 0, and the frequency domain offset is 0*X RB/RE. Suppose that SS/PBCH block index 0 is transmitted in time domain position 1, and the frequency domain offset is 1*X RB/RE. Suppose that SS/PBCH block index 0 is transmitted in time domain position 2, and the frequency domain offset is 2*X RB/RE. Suppose SS/PBCH block index 0 is sent in time domain 3, and the frequency domain offset is 3*X RB/RE. Suppose the SS/PBCH block index i is transmitted in the time-domain position i+n, and the frequency domain offset is (i+n−i)*X RB/RE.

Optionally, the frequency offset may be notified to the UE, for example, carried by the MIB, the PBCH payload, the PBCH generation sequence or the scrambling sequence, or the DMRS generation sequence or the scrambling sequence in the PBCH. The UE can obtain the offset information according to the demodulation of the above information or sequence.

The UE determines the actual time domain location (time domain location i+n), symbol/time slot location, or the original SS/PBCH sequence number (index i+n) corresponding to this time domain location, according to the index (index i) of the received SS/PBCH block and the frequency domain offset. The original corresponding SS/PBCH sequence number (index i+n), in order to correctly perform time-frequency synchronization. The association relationship between the received SS/PBCH block and the RACH does not change, and/or the measurement behavior of the UE based on the received SS/PBCH block does not change. In one example, the UE sends RACH on its associated RACH resource according to index i of the received SS/PBCH block. The UE performs corresponding L3-RRM measurement and/or L1-RRM measurement according to index i of the received SS/PBCH block, thereby reporting the correct measurement result.

In a fourth embodiment, the SS/PBCH block index i+n is transmitted in the time domain position i+n, that is, the index of the SS/PBCH block is i+n. Optionally, the base station sends the SS/PBCH block index i+n on the beam i (assuming that the SS/PBCH block index i+n should always be sent on the associated beam i+n, and SS/PBCH block index i should be sent on the associated beam i). That is, the base station may send SS/PBCH blocks with different index numbers on the same beam. Or, the same numbered SS/PBCH block may be sent on different beams. The UE does not assume that the same numbered SS/PBCH block (e.g., SS/PBCH block index i+n) is always transmitted on the same beam (e.g., beam i+n). In other words, the UE may assume that SS/PBCH blocks of different index numbers may be transmitted by the same beam. Or, the UE will assume that the same beam may send SS/PBCH blocks of different index numbers. In this embodiment, it is assumed that SS/PBCH block index i+n is transmitted on beam i. The scrambled or generated sequence in the PBCH and/or DMRS carries the SS/PBCH block index number i+n.

For example, in a beam sweeping or non-beam seeping scenario, the SS/PBCH block index i is located in the time domain position i in the half frame, that is, the SS/PBCH block index 0 is located in the time domain position 0; the SS/PBCH block index 1 is located in the time domain position 1; . . . the SS/PBCH block index L-1 is located in the time domain position L-1; the time domain position 0 to the position L-1 are located in different time domain positions in the transmission window or in the burst set.

It is assumed that the above L SS/PBCH blocks are located at f0 in the frequency domain, wherein f0 is a frequency domain reference location, e.g. the absolute radio frequency channel number (ARFCN) of the SS/PBCH block. In order to correctly know the beam i number of the transmitted SS/PBCH block, when SS/PBCH block index i+n is transmitted in the time-domain position i+n, a frequency domain offset of SS/PBCH block index i with respect to f0 in the frequency domain may be configured. For example, the offset is equal to n*X RE/RB or SS/PBCH blocks. X is the offset size in the frequency domain where the index offset is 1 (n=1). The unit can be RE, RB or SS/PBCH block. The frequency domain offset can be represented by the difference of the beam number, the difference of the time domain location, the difference of the SS/PBCH block index, or the index offset between the beam of the SS/PBCH block index i+n transmission and the beam associated with the SS/PBCH block index i+n. Suppose that in the time domain position 0, SS/PBCH block index 0 is transmitted on beam 0, and the frequency domain offset is 0*X RB/RE. Suppose that in the time domain position 1, SS/PBCH block index 1 is transmitted on beam 0, and the frequency domain offset is 1*X RB/RE. Suppose that in the time domain position 2, the SS/PBCH block index 2 is transmitted on beam 0, and the frequency domain offset is 2*X RB/RE. Suppose that in the time domain position 3, SS/PBCH block index 3 is transmitted on beam 0, and the frequency domain offset is 3*X RB/RE. Suppose in the time-domain position i+n, the SS/PBCH block index i+n is transmitted on beam i, and the frequency domain offset is (i+n−i)*X RB/RE.

Optionally, the frequency offset may be notified to the UE, for example, and carried by the MIB, the PBCH payload, the PBCH generation sequence or the scrambling sequence, or the DMRS generation sequence or the scrambling sequence in the PBCH. The UE can obtain the offset information according to the demodulation of the above information or sequence.

The UE determines the time domain location (time domain location i+n) or symbol/slot location at this time based on the index (index i+n) of the received SS/PBCH block, in order to correctly perform time-frequency synchronization. The association relationship between the SS/PBCH block (e.g., index i+n) received by the UE and the RACH is unchanged or changed. When the association does not change, the UE sends RACH on its associated RACH resource according to the index (index i+n) of the received SS/PBCH block. When the association changes, the UE determines the SS/PBCH block number (index i) that the base station originally planned to send or the original SS/PBCH block number (index i) that is associated with the beam, according to the received index of the SS/PBCH block (index i+n) and the time domain offset, and sends RACH on its associated RACH resource.

The UE determines the SS/PBCH block number (index i) originally planned to be transmitted by the base station or the original SS/PBCH block number (index i) associated with the beam according to the received index of the SS/PBCH block (index i+n) and the frequency domain offset, to perform the corresponding L3-RRM measurement and/or L1-RRM measurement to report the correct measurement result. That is, the measurement result of the SS/PBCH block index i+n may be counted down to the SS/PBCH block index i (associated with beam i).

In a fifth embodiment, using Case A as an example, the sub-carrier spacing SCS is 15 kHz. Taking the carrier frequency at 3 GHz and below as an example, the maximum number L of SS/PBCH blocks is 4. As shown in FIG. 7, in the half-frame window, the index numbers of the four SS/PBCH blocks are 0, 1, 2, and 3 in order. The time domain locations sent by these four SS/PBCH blocks are 0, 1, 2, and 3, respectively. If four SS/PBCH blocks are newly defined in the SS/PBCH block transmission window, the time domain positions are 4, 5, 6, and 7 respectively.

In situation A, it is assumed that the SS/PBCH block index range does not increase, and it is still 0 to 3. That is, the SS/PBCH block index sent on the time domain positions 4, 5, 6, and 7 are still 0, 1, 2, 3, which may or may not have a one-to-one correspondence with the time domain positions, which is also applicable to other SS/PBCH transmission cases.

In situation A1, time domain positions 4, 5, 6, and 7 correspond to SS/PBCH block indices 0, 1, 2, 3, respectively. That is, SSB 0 is sent in time domain position 4, SSB 1 is sent in time domain position 5, etc. According to the first embodiment or the third embodiment described above, the UE can perform correct time-frequency synchronization according to the received SSB index, and time domain offset or frequency domain offset. In one embodiment, correct time-frequency synchronization is performed according to the received SSB index and SSB flag. SSB flag=0 may indicate the original position of SSB i, and SSB flag=1 may indicate the newly defined position of SSB i. For example, for SSB 0, if SSB flag=0, SSB 0 is transmitted at time domain position 0, and if SSB flag=1, SSB 0 is transmitted at time domain position 4. The SSB flag can also be applied to other embodiments. The UE may determine to the beam for transmitting the SS/PBCH block according to the received SS/PBCH block index, to correctly report the preferred beam or beam measurements. The above process is also similar to the first embodiment or the third embodiment.

In situation A2, the time domain positions 4, 5, 6, and 7 do not correspond to SS/PBCH block indices 0, 1, 2, and 3, respectively. For example, SSB 0 is transmitted in time domain position 4, SSB 0 may also be transmitted in time domain position 5, etc. According to the first embodiment or the third embodiment described above, the UE can perform correct time-frequency synchronization according to the received SS/PBCH block index, and time domain offset or frequency domain offset. The UE may determine the beam for transmitting the SS/PBCH block according to the index of the received SS/PBCH block, to correctly report the preferred beam or beam measurements. The UE will assume the same number SSB, for example, the SS/PBCH block index i always transmitted by the same beam (e.g., beam i). The base station assumes the same. The above process is also consistent with the first embodiment or the third embodiment.

In situation B, it is assumed that the range of the SS/PBCH block index extends (previous range is 0-3) to 0-7, respectively. That is, the SS/PBCH block index numbers sent on the time domain positions 4, 5, 6, and 7 are still 4, 5, 6, and 7, which may or may not have a one-to-one correspondence with the time domain positions, which is also applicable to other SS/PBCH transmission cases.

In situation B1, the time domain positions 4, 5, 6, and 7 correspond to SS/PBCH block indices 4, 5, 6, and 7 respectively. For example, the SS/PBCH block 4 is sent in time domain position 4, the SS/PBCH block 5 is sent in time domain position 5, etc. The UE can perform correct time-frequency synchronization according to the received SS/PBCH block index. The UE can perform correct beam identification based on the received SS/PBCH block index, and time domain offset or frequency domain offset, according to the predefined association of the SS/PBCH block index and the beam, to determine the beam of the received SS/PBCH block. Alternatively, the received SSB number is i and x=i mod L, that is, the received SSB number is modulo-formed with the maximum number of previous SSBs (or the maximum number of beams). The RACH resource associated with the SSB i is equal to the RACH resource associated with the SSB x, and the measurement result of the SSB i is combined with or equivalent to the SSB x measurement result. For example, in this embodiment, the maximum number of beams L=4; the predefined SSB index 0 and the SSB index 4 correspond to the beam 0; the SSB index 1 and the SSB index 5 correspond to the beam 1, etc. For the sent or received SSB index i (i=4), i mod L (L=4)=0, therefore, the UE receives the SSB index 4, sends RACH on the RACH resource associated with the SSB index 0, and the measurement result of the SSB index 4 and the SSB index 0 measurement results are equivalent and can be combined.

In situation B2, the time domain positions 4, 5, 6, and 7 do not correspond to SS/PBCH block indices 4, 5, 6, and 7 respectively. For example, SSB 4 is sent in time domain position 4, and SSB 4 can also be sent in time domain position 5, etc. The time domain synchronization and/or the beam correlation may refer to the first to the fourth embodiments or the above-mentioned parts of the fifth embodiment. Multiple SSBs can be associated with a beam here. For example, the predefined SSB index 0 and the SSB index 4 correspond to the beam 0, the SSB index 1 and the SSB index 5 correspond to the beam 1, etc. If it is defined that the SSB 0 is transmitted through the beam 0 in the time domain position 0, or the SSB 4 is transmitted through the beam 0 in the time domain position 4, it is similar to the situation B1. If the SSB 4 is transmitted through the beam 0 in the time domain position 5, it can be handled according to the first embodiment, the third embodiment, or the situation B1 of the fifth embodiment. If the SSB 5 is transmitted through the beam 0 in the time domain position 5, it can be handled according to the second embodiment, the fourth embodiment, or the situation B1 of the fifth embodiment.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

We claim:

1. A method performed by a wireless communication node, the method comprising:
    determining a first time domain position associated with a transmission of a first block by the wireless communication node according to a first configuration; and
    transmitting a second block at the first time domain position according to a second configuration, wherein the second configuration is different from the first configuration.

2. The method of claim 1, wherein:
    the first configuration comprises information related to as least one of: a first index number of the first block and a first beam for transmitting the first block; and
    the second configuration comprises information related to as least one of: a second index number of the second block and a second beam for transmitting the second block,
    wherein preferably the second configuration is different from the first configuration by at least one of:
    the first index number is different from the second index number; and
    the first beam is different from the second beam.

3. The method of claim 1, wherein:
    the first block and the second block are synchronization signal physical broadcast channel (SS/PBCH) blocks; and
    the method further comprises transmitting at least one additional SS/PBCH block, in addition to the second block, at the first time domain position according to a third configuration.

4. The method of claim 1, further comprising transmitting a time domain offset to a wireless communication device that receives the second block, wherein the wireless communication device performs at least one of:
    identifying the first time domain position based on an index number of the second block and the time domain offset;
    identifying an index number of the first block based on an index number of the second block and the time domain offset;

performing synchronization based on the identified first time domain position;
performing synchronization based on the identified index number of the first block;
performing a random access procedure on a random access channel (RACH) resource associated with the index number of the second block; and
performing at least one radio resource management (RRM) measurement according to the index number of the second block,
wherein preferably the time domain offset refers to at least one of:
  an offset of the first time domain position relative to a starting position of a transmission window for transmitting the second block;
  an offset of the first time domain position relative to a starting position of a burst set comprising the second block;
  an offset of the first time domain position relative to a time domain position associated with the second block;
  an offset of the first time domain position relative to an index number of the second block; and
  an offset of the index number of the first block to the index number of the second block,
wherein preferably the time domain offset is represented by at least one of:
  a sub-frame;
  a time slot;
  a symbol;
  a difference between index numbers of time domain positions;
  a difference between numbers of blocks; and
  a difference between index numbers of blocks,
wherein preferably the time domain offset is carried by at least one of:
  a master information block (MIB);
  a physical broadcast channel (PBCH) payload;
  a PBCH generation sequence;
  a PBCH scrambling sequence;
  a generation sequence of demodulation reference signal (DMRS) associated with the PBCH; and
  a scrambling sequence of DMRS associated with the PBCH, wherein the wireless communication device obtains the time domain offset based on a demodulation of at least one of the above information or sequences.

5. The method of claim 1, wherein the transmission of the second block is associated with a frequency domain offset between a frequency position of the second block relative to a frequency domain reference location, wherein a wireless communication device receiving the second block performs at least one of:
  determining the frequency domain offset based on a demodulation of at least one of:
    a master information block (MIB),
    a physical broadcast channel (PBCH) payload,
    a PBCH generation sequence,
    a PBCH scrambling sequence,
    a generation sequence of DMRS associated with the PBCH, and
    a scrambling sequence of DMRS associated in the PBCH; and
  determining an offset based on a detection of the frequency domain offset.

6. The method of claim 1, further comprising transmitting a time domain offset to a wireless communication device that receives the second block, wherein:
  the first block is associated with a first index number and is transmitted based on a first beam;
  the second block has the first index number and is configured for transmission based on a second beam; and
  the wireless communication device performs at least one of:
    identifying the first time domain position based on the first index number,
    performing synchronization based on the identified first time domain position,
    performing synchronization based on the first index number,
    performing a random access procedure on a random access channel (RACH) resource based on at least one of: the first index number and the time domain offset, and
    performing at least one radio resource management (RRM) measurement according to both the first index number and the time domain offset,
wherein preferably the time domain offset refers to at least one of:
  an offset of the first time domain position relative to a starting position of a transmission window for transmitting the second block;
  an offset of the first time domain position relative to a starting position of a burst set comprising the second block;
  an offset of the first time domain position relative to a time domain position associated with the second block;
  an offset of the first time domain position relative to an index number of the second block; and
  an index offset between the second beam and the first beam,
wherein preferably the time domain offset is represented by at least one of:
  a sub-frame;
  a time slot;
  a symbol;
  a difference between index numbers of time domain positions;
  a difference between numbers of blocks;
  a difference between index numbers of blocks; and
  a difference between index numbers of beams.

7. The method of claim 1, further comprising:
  transmitting a flag indicator to indicate the first time domain position or a second time domain position associated with the second block.

8. The method of claim 1, further comprising:
  determining a maximum number L of beams configured for block transmission in a transmission window or a burst set, wherein for each transmitted block having an index number i, the wireless communication device identifies a beam that has an index number x=i mod L and is associated with the transmitted block.

9. A method performed by a wireless communication device, the method comprising:
  receiving a first block transmitted by a wireless communication node at a first time domain position according to a first configuration, wherein the first time domain position is associated with a transmission of a second block by the wireless communication node according to a second configuration, and the second configuration is different from the first configuration.

10. The method of claim 9, wherein:
the first configuration comprises information related to as least one of: a first index number of the first block and a first beam for transmitting the first block; and
the second configuration comprises information related to as least one of: a second index number of the second block and a second beam for transmitting the second block,
wherein preferably the second configuration is different from the first configuration by at least one of:
the first index number is different from the second index number; and
the first beam is different from the second beam.

11. The method of claim 9, wherein:
the first block and the second block are synchronization signal physical broadcast channel (SS/PBCH) blocks; and
the method further comprises receiving at least one additional SS/PBCH block, in addition to the first block, at the first time domain position according to a third configuration.

12. The method of claim 9, further comprising at least one of:
receiving a time domain offset from the wireless communication node that transmits the first block;
identifying the first time domain position based on an index number of the first block and the time domain offset;
identifying an index number of the first block based on an index number of the second block and the time domain offset;
performing synchronization based on the identified first time domain position;
performing synchronization based on the identified index number of the first block;
performing a random access procedure on a random access channel (RACH) resource associated with the index number of the first block; and
performing at least one radio resource management (RRM) measurement according to the index number of the first block,
wherein preferably the time domain offset refers to at least one of:
an offset of the first time domain position relative to a starting position of a transmission window for transmitting the first block;
an offset of the first time domain position relative to a starting position of a burst set comprising the first block;
an offset of the first time domain position relative to a time domain position associated with the first block;
an offset of the first time domain position relative to an index number of the first block; and
an offset of the index number of the first block to the index number of the second block,
wherein preferably the time domain offset is represented by at least one of:
a sub-frame;
a time slot;
a symbol;
a difference between index numbers of time domain positions;
a difference between numbers of blocks; and
a difference between index numbers of blocks,
wherein preferably the time domain offset is received based on a demodulation of at least one of:
a master information block (MIB);
a physical broadcast channel (PBCH) payload;
a PBCH generation sequence;
a PBCH scrambling sequence;
a generation sequence of demodulation reference signal (DMRS) associated with the PBCH; and
a scrambling sequence of DMRS associated with the PBCH.

13. The method of claim 9, further comprising performing at least one of:
determining a frequency domain offset between a frequency position of the second block relative to a frequency domain reference location based on a demodulation of at least one of:
a master information block (MIB),
a physical broadcast channel (PBCH) payload,
a PBCH generation sequence,
a PBCH scrambling sequence,
a generation sequence of DMRS associated with the PBCH, and
a scrambling sequence of DMRS associated in the PBCH; and
determining an offset based on a detection of the frequency domain offset.

14. The method of claim 9, wherein:
the first block is associated with a first index number and is transmitted based on a first beam;
the second block has the first index number and is configured for transmission based on a second beam; and
the method further comprises at least one of:
receiving a time domain offset from the wireless communication node that transmits the first block;
identifying the first time domain position based on the first index number,
performing synchronization based on the identified first time domain position,
performing synchronization based on the first index number,
performing a random access procedure on a random access channel (RACH) resource based on at least one of: the first index number and the time domain offset, and
performing at least one radio resource management (RRM) measurement according to both the first index number and the time domain offset,
wherein preferably the time domain offset refers to at least one of:
an offset of the first time domain position relative to a starting position of a transmission window for transmitting the first block;
an offset of the first time domain position relative to a starting position of a burst set comprising the first block;
an offset of the first time domain position relative to a time domain position associated with the first block;
an offset of the first time domain position relative to an index number of the first block; and
an index offset between the first beam and the second beam,
wherein preferably the time domain offset is represented by at least one of:
a sub-frame;
a time slot;
a symbol;

a difference between index numbers of time domain positions;
a difference between numbers of blocks;
a difference between index numbers of blocks; and
a difference between index numbers of beams.

15. The method of claim 9, further comprising:
receiving a flag indicator associated with the first block; and
identifying, based on the flag indicator, the first time domain position or a second time domain position associated with the first block.

16. The method of claim 9, further comprising:
determining a maximum number L of beams configured for block transmission in a transmission window or a burst set; and
identifying, for each transmitted block having an index number i, a beam that has an index number x=i mod L and is associated with the transmitted block.

17. A non-transitory computer-readable medium having stored thereon computer-executable instructions for carrying out the method of claim 1.

18. A non-transitory computer-readable medium having stored thereon computer-executable instructions for carrying out the method of claim 3.

19. A non-transitory computer-readable medium having stored thereon computer-executable instructions for carrying out the method of claim 9.

20. A non-transitory computer-readable medium having stored thereon computer-executable instructions for carrying out the method of claim 11.

* * * * *